US 7,653,548 B2

(12) United States Patent
Kaneko et al.

(10) Patent No.: US 7,653,548 B2
(45) Date of Patent: Jan. 26, 2010

(54) TELEVISION RECEIVER

(75) Inventors: Mayumi Kaneko, Dalto (JP); Toshihiro Takagi, Dalto (JP)

(73) Assignee: Funai Electric Co., Ltd., Osaka (JP)

( * ) Notice: Subject to any disclaimer, the term of this patent is extended or adjusted under 35 U.S.C. 154(b) by 694 days.

(21) Appl. No.: 11/443,283

(22) Filed: May 31, 2006

(65) Prior Publication Data

US 2006/0277050 A1 Dec. 7, 2006

(30) Foreign Application Priority Data

May 31, 2005 (JP) .............................. 2005-159499

(51) Int. Cl.
*G10L 21/00* (2006.01)

(52) U.S. Cl. .................................... 704/275
(58) Field of Classification Search ................. 704/270, 704/275
See application file for complete search history.

(56) References Cited

U.S. PATENT DOCUMENTS

| 5,086,385 | A | * | 2/1992 | Launey et al. | 700/83 |
| 5,247,580 | A | * | 9/1993 | Kimura et al. | 704/275 |
| 5,267,323 | A | * | 11/1993 | Kimura | 381/110 |
| 6,606,280 | B1 | * | 8/2003 | Knittel | 367/198 |
| 6,889,191 | B2 | * | 5/2005 | Rodriguez et al. | 704/275 |
| 7,006,974 | B2 | * | 2/2006 | Burchard et al. | 704/275 |
| 7,260,538 | B2 | * | 8/2007 | Calderone et al. | 704/275 |
| 7,293,276 | B2 | * | 11/2007 | Phillips et al. | 725/42 |
| 2005/0027539 | A1 | * | 2/2005 | Weber et al. | 704/275 |
| 2005/0144009 | A1 | * | 6/2005 | Rodriguez et al. | 704/275 |

FOREIGN PATENT DOCUMENTS

JP 2001-275176 A 10/2001

* cited by examiner

*Primary Examiner*—Michael N Opsasnick
(74) *Attorney, Agent, or Firm*—Pillsbury Winthrop Shaw Pittman, LLP

(57) ABSTRACT

A television receiver includes an OSD display section configured to display a desired OSD, and a voice input section to which voices are inputted. The receiver also includes a storage section having prestored therein a control code associated with a voice representing a command to change channels or an analogous command, and a call-up control code associated with a voice for causing the display section to display a character image in an OSD manner. The receiver further includes a control section configured to cause the display section to display the character image associated with the call-up control code when a voice associated with the call-up control code is inputted through the voice input section. The control section instructs components of a receiver body to perform respective operations for executing the command according to the control code only during a time period during which the display section displays the character image.

5 Claims, 10 Drawing Sheets

FIG. 1
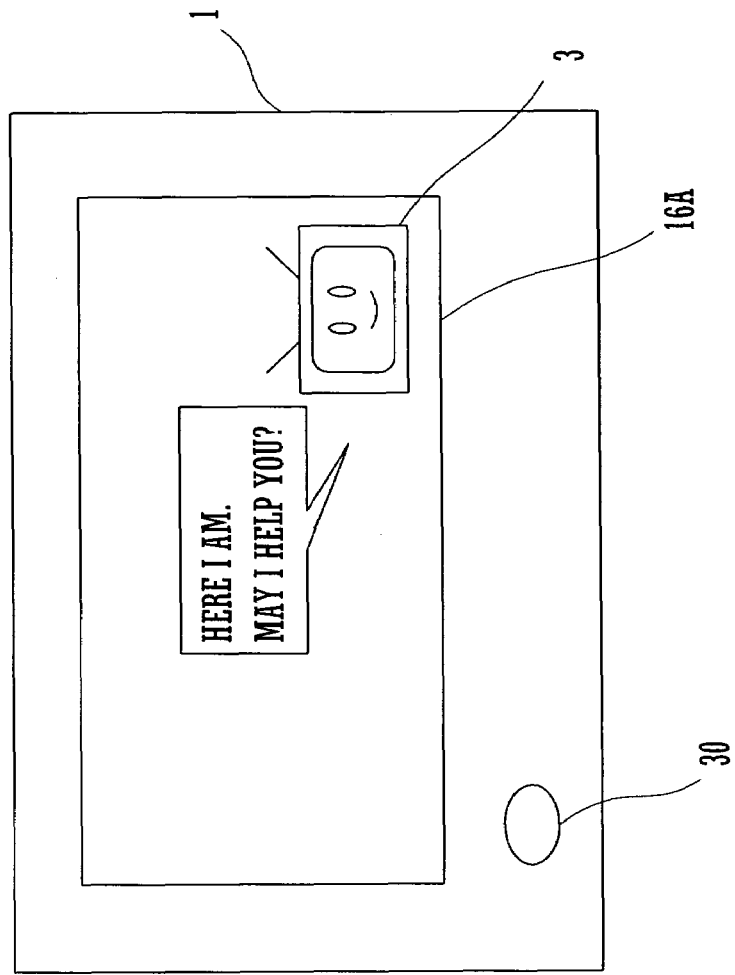
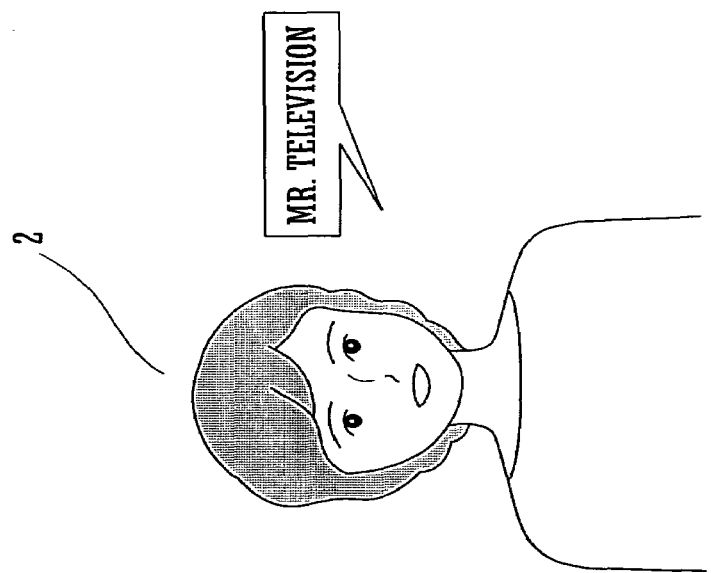

FIG. 3

| WORD (CALL-UP VOICE) | CALL-UP CONTROL CODE |
|---|---|
| MR. TELEVISION | 0000000011 |
| MISS TELEVISION | 0000000111 |
| TELEVISION MAN | 0000001111 |
| ---- | ---- |

| WORD (VOICE) | CONTROL CODE |
|---|---|
| POWER | 1100000011 |
| CHANNEL ONE | 1100000111 |
| CHANNEL TWO | 1100001111 |
| ---- | ---- |

| CALL-UP CONTROL CODE | AGENT PG | CHARACTER |
|---|---|---|
| 0000000011 | AGENT A | MR. TELEVISION |
| 0000000111 | AGENT B | MISS TELEVISION |
| 0000001111 | AGENT C | TELEVISION MAN |
| ---- | ---- | ---- |

TELEVISION RECEIVER

CROSS REFERENCE

This Nonprovisional application claims priority under 35 U.S.C.§ 119(a) on Patent Application No. 2005-159499, filed in Japan on May 31, 2005, the entire contents of which are hereby incorporated by reference.

BACKGROUND OF THE INVENTION

The present invention relates to television receivers for displaying/outputting video images such as television broadcasting signals and, more particularly, a television receiver configured to recognize voices of a user and control the receiver body based on the voices.

The voice recognition technology for recognizing voices inputted includes the technique of extracting a word-like portion of a voice being uttered, which is so-called word spotting, the technique of recognizing successive voices by using HMM (Hidden Marcov Model), and like techniques.

Conventionally widespread television receivers are generally provided with an infrared wireless remote controller for remote control of such a television receiver. Existing television receivers of another type adopt the aforementioned voice recognition technology for remote control by voices.

For example, when the user utters a voice representing a command to power ON/OFF, change channels or adjust the sound volume or a like command, the television receiver receives the voice by means of a microphone or the like and recognizes the voice. This conventional television receiver executes the command to power ON/OFF, change channels or adjust the sound volume or the like command according to the voice recognized.

A remote controller has been proposed as disclosed in Japanese Patent Laid-Open Publication No. 2001-275176. This remote controller includes a microphone for receiving voices uttered by the user, a voice recognition section for recognizing these voices, and a voice recognition switch for enabling or disabling the voice recognition operation of the voice recognition section switchably. The remote controller is configured to recognize voices uttered by the user only when the voice recognition switch is in the depressed position and then transmit a command (control code) for remote-controlling a controlled apparatus such as a television receiver according to the voices.

The aforementioned conventional television receiver, however, is configured to receive voices by means of the microphone and, hence, sometimes receives voice and sound of a TV program along with voices uttered by the user undesirably. Accordingly, the conventional television receiver often experiences malfunctions because the television receiver recognizes a voice that does not meet the intention of the user and then executes a command according to such a voice.

The aforementioned remote controller disclosed in Japanese Patent Laid-Open Publication No. 2001-275176 recognizes voices uttered by the user only when the voice recognition switch is in the depressed position. Depressing of the switch relies upon a manual operation performed by the user. This means that the user has to perform a manual operation every time a command is given to power ON/OFF, change channels, adjust the sound volume, or the like. For this reason, the user feels it inconvenience. In addition, such an inconvenience manual operation by the user does not meet the purpose of "remote-controlling the television receiver by voice" and, hence, this remote controller is, in no way, different from an infrared wireless remote controller.

Accordingly, a feature of the present invention is to provide a television receiver which does not need any manual operation by the user and which has a lowered possibility of a malfunction caused by voice and sound of a television program.

SUMMARY OF THE INVENTION

A television receiver according to the present invention includes an OSD (On Screen Display) display section configured to display a desired OSD, a voice input section to which voices are inputted, and a voice recognition section configured to recognize the voices inputted from the voice input section. The voice input section, which is capable of receiving voices uttered by the user, comprises a microphone for example.

The television receiver also includes a storage section having prestored therein a control code associated with a voice representing a command to power ON/OFF, change channels or adjust a sound volume or an analogous command, and a call-up control code associated with a voice for causing the OSD display section to display a character image in an OSD manner, the character image being defined in an agent program for assisting the user in inputting the command. The voice for causing the OSD display section to display the character image is preferably the name of the character. Examples of such character's names include Mr. Television, Miss. Television, and Television Man.

The television receiver further includes a recognized voice processing section configured to read the control code or the call-up control code associated with the voice recognized by the voice recognition section out of the storage section, and a control section configured to execute the agent program to cause the OSD display section to display the character image when the recognized voice processing section has read the call-up control code associated with the voice recognized by the voice recognition section out of the storage section.

The control section instructs components of a receiver body to perform respective operations for executing the command according to the control code read out by the recognized voice processing section only during a time period during which the OSD display section displays the character image.

With this configuration, a command is disregarded unless the user utters or calls up the "character's name" to display the character on the screen of the OSD display section. Specifically, even if only a "command name" is uttered from a television program (or the user), the control section fails to instruct the components of the receiver body to perform their respective operations for executing the command according to the control code associated with the command name. Therefore, even when only the voice "channel 8" is uttered from a television program, the control section disregards this command, so that the current channel fails to change to channel 8. When the user wants to change channels, the user simply has to say "Miss. Television, channel 8" to the television receiver.

The foregoing and other features and attendant advantages of the present invention will become apparent from the reading of the following detailed description of the preferred embodiments in conjunction with the accompanying drawings.

BRIEF DESCRIPTION OF THE DRAWINGS

FIG. 1 is a conceptual view illustrating a state where the user calls up a character;

FIG. 3 is a table showing correspondences between words stored in a storage section 34 and control codes and call-up control codes associated with the respective words;

FIG. 4 is a table showing correspondences between call-up control codes stored in a storage section 21 and agent programs associated with the respective call-up control codes;

DETAILED DESCRIPTION OF THE PREFERRED EMBODIMENTS

Figure 2:
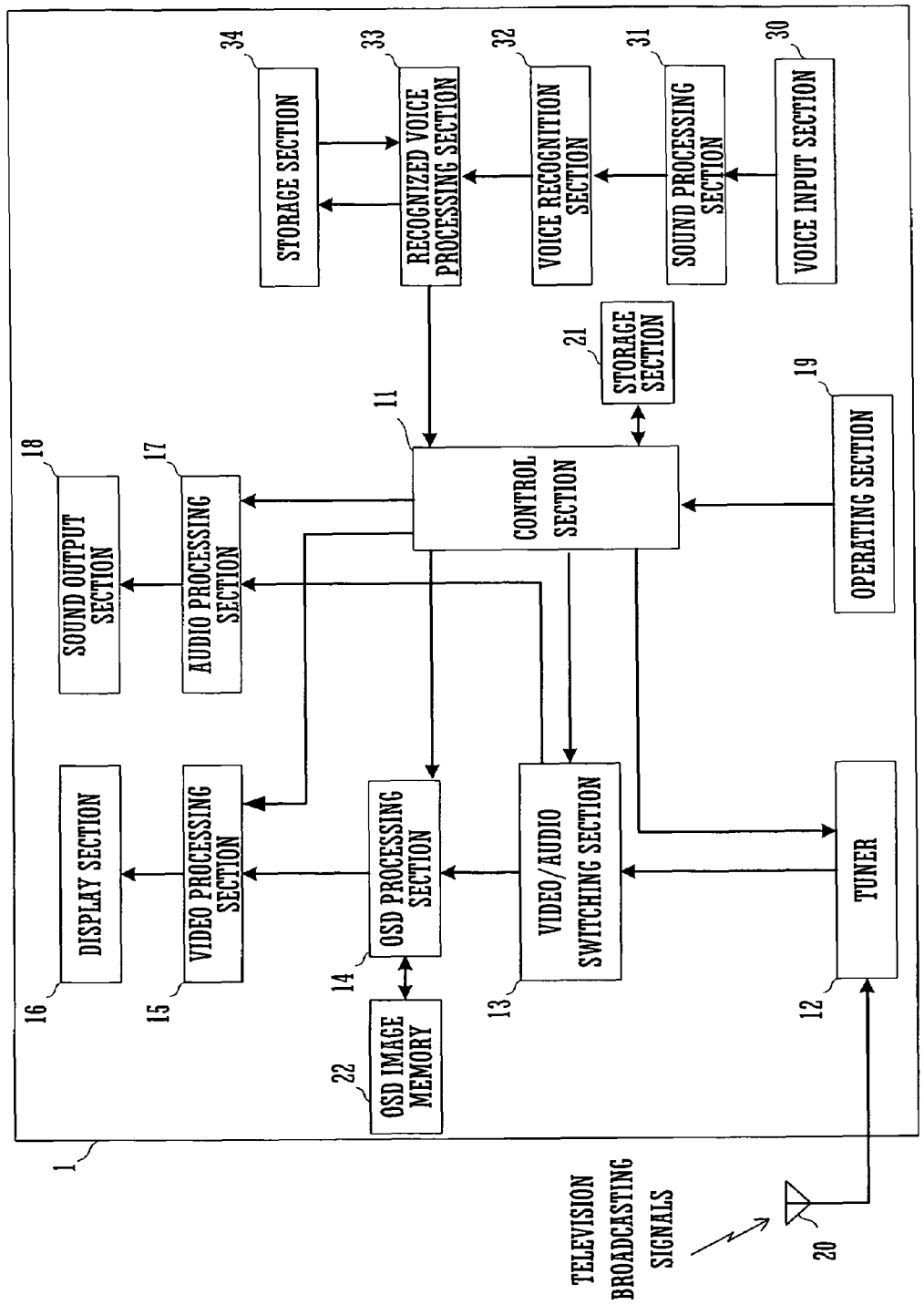
FIG. 2 is a block diagram showing a basic configuration of a television receiver according to a first embodiment of the present invention.

Hereinafter, a television receiver according to the first embodiment of the present invention will be described in detail.

FIG. 1 is a conceptual view illustrating a state where the user calls up a character. A television receiver (hereinafter will be referred to as TV receiver) 1 includes a CRT 16A configured to display video images, and a voice input section 30 comprising a microphone or the like for receiving sounds.

When the user 2 utters the name of a character "Mr. Television", the TV receiver 1 displays the image of character 3 on the CRT 16A in an OSD manner. The character 3 gives a message responding to the calling from the user.

Subsequently, the user 2 utters a command name "Channel One" to cause the TV receiver 1 to change the current channel to channel 1.

In this way, the user 2 remotely controls the TV receiver 1 interactively with the character 3 displayed.

FIG. 2 is a block diagram showing a basic configuration of the television receiver according to the first embodiment of the present invention.

The TV receiver 1 also includes a control section 11 configured to control the entire TV receiver 1, a tuner 12, a video/audio switching section 13, an OSD processing section 14, a video processing section 15, a display section 16, an audio processing section 17, a sound output section 18, an operating section 19, a storage section 21, and OSD image memory 22.

The TV receiver 1 further includes a voice input section 30, a sound processing section 31, a voice recognition section 32, a recognized voice processing section 33, and a storage section 34.

When a command to power ON/OFF, change channels or adjust a sound volume or a like command is inputted to the operating section 19, the operating section 19 transfers the command to the control section 11.

The tuner 12 extracts television broadcasting signals on a currently selected channel from all the television broadcasting signals received through an antenna 20 and then outputs the signals thus extracted.

The video/audio switching section 13 separates the television signals outputted from the tuner 12 into video signals and audio signals, extracts the video signals and the audio signals separately, and outputs these signals.

The video signals outputted from the video/audio switching section 13 are inputted to the video processing section 15 via the OSD processing section 14.

The OSD image memory 22 comprises ROM for example. The OSD image memory 22 has character images stored therein. These character images include the image of the character 3 shown in FIG. 1.

The OSD processing section 14 superimposes such a character image stored in the OSD image memory 22 and a response message of the character on the video signals.

The video processing section 15 outputs the video signals outputted from the video/audio switching section 13 to the display section 16, which in turn displays the corresponding video image on the CRT 16A.

The audio processing section 17 amplifies the audio signals outputted from the video/audio switching section 13 and outputs the audio signals thus amplified to the sound output section 18. The sound output section 18 outputs sounds to the exterior. The sound output section 18 comprises a speaker for example.

The components of the TV receiver 1 are each supplied with power from a non-illustrated power source section. This power source section has an input connected to a commercial power source (AC 100V for example).

The OSD processing section 14, video processing section 15, display section 16 and OSD image memory 22 form the "OSD display section" defined by the present invention.

The voice input section 30 is capable of receiving sounds and comprises a microphone for example. When the sound of a television program, voice of the user or sound comprising ambient noises is inputted to the voice input section 30, the voice input section 30 converts such sound or voice to audio signals and then outputs these audio signals to the sound processing section 31.

The sound processing section 31 eliminates noises from the audio signals outputted from the voice input section 30 by noise canceling and then outputs the thus noise-eliminated audio signals to the voice recognition section 32.

The voice recognition section 32 performs voice recognition by using the audio signals outputted from the sound processing section 31 and then outputs words (data) corresponding to the recognized voices to the recognized voice processing section 33.

FIG. 3 is a table showing correspondences between words stored in the storage section 34 and control codes and call-up control codes associated with the respective words.

The storage section 34 comprises ROM for example. If it is desired that the contents stored in the storage section 34 be updatable, the storage section 34 comprises EEPROM for example.

The storage section 34 has stored therein correspondences between words and their respective associated control codes and call-up control codes in a table form. Specifically, the storage section 34 has prestored therein control codes each associated with a respective one of voices (words) each representing a command such as to power ON/OFF, change channels or adjust the sound volume or a like command. The storage section 34 has further prestored therein call-up control codes each associated with a respective one of call-up voices (words) each causing a corresponding character image to be displayed in an OSD manner. Such a character image is defined in an agent program for assisting the user in inputting commands.

Preferably, each of the call-up voices represents the name of a respective one of the characters. Examples of such characters' names include Mr. Television, Miss. Television, and Television Man.

The recognized voice processing section 33 searches the table stored in the storage section 34 for the control code or call-up control code associated with the word outputted from the voice recognition section 32 and reads it out of the storage section 34. The recognized voice processing section 33 then outputs the code thus read out to the control section 11. If the word outputted from the voice recognition section 32 is "Mr. Television" for example, the recognized voice processing section 11 outputs the call-up control code "0000000011" to the control section 11. Alternatively, if the word outputted from the voice recognition section 32 is "Channel One", the recognized voice processing section 11 outputs the control code "1100000111" to the control section 11.

FIG. 4 is a table showing correspondences between call-up control codes stored in the storage section 21 and their respective associated agent programs.

The storage section 21 comprises ROM for example. If it is desired that the contents stored in the storage section 21 be updatable, the storage section 21 comprises EEPROM for example.

The storage section 21 has prestored therein correspondences between call-up control codes and their respective associated agent programs in a table form. The storage section 21 has further prestored therein the plural agent programs and characters each defined in a respective one of the agent programs. The images of respective characters are stored in the OSD image memory 22.

The plural agent programs are provided because it is assumed that the members of a family are each assigned one of the agent programs; for example, a parent assigned an agent program A and a child assigned an agent program B.

Settings in each agent program are preferably changeable. Examples of changes of settings include change of password to be described later, change of character, and change of character's name. For the user to change settings in each agent program, it is preferable that the control section 11 causes the CRT 16A to display a password input prompting screen thereby prompting the user to input (utter) the password. The password input prompting screen is prestored in the OSD image memory 22 and the OSD processing section 14 superimposes the password input prompting screen on video signals.

With such a configuration, the members of a family can use respective agent programs (characters).

Figure 5:
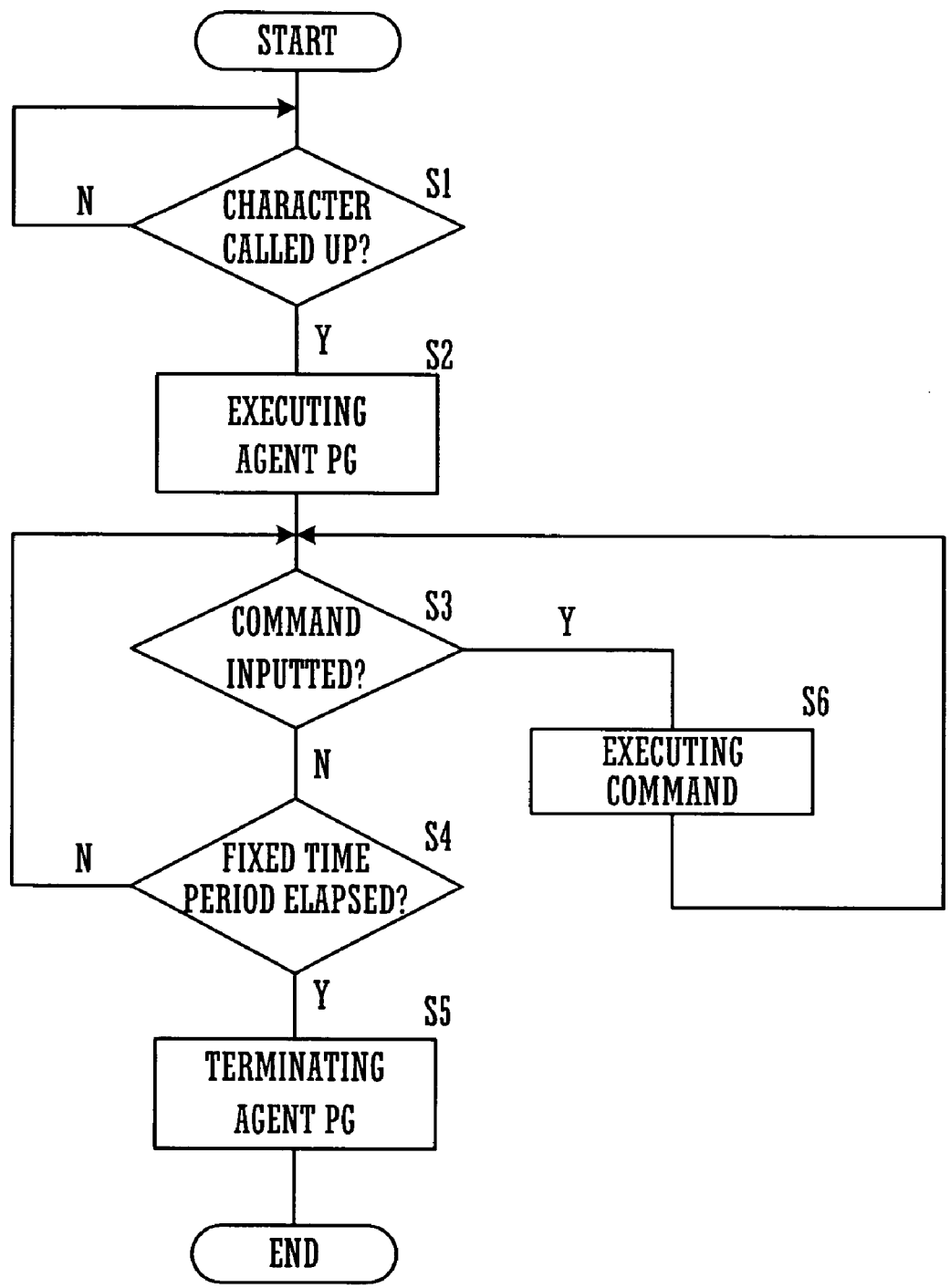
FIG. 5 is a flowchart of process steps of an operation performed by a control section of the television receiver according to the first embodiment of the present invention.

FIG. 5 is a flowchart of process steps of an operation performed by the control section of the television receiver according to the first embodiment of the present invention.

With the television receiver powered ON, the control section 11 determines whether or not the user is calling up a character (step s1). This determination is based on whether the recognized voice processing section 33 has outputted a call-up code to the control section 11.

If the recognized voice processing section 33 has not outputted any call-up control code to the control section 11, the control section 11 performs the step s1 again to continue the process. This means that if the code outputted by the recognized voice processing section 33 is not a call-up control code but a control code, the control section 11 disregards this control code.

Accordingly, the command associated with the control code is disregarded unless the user 2 utters the name of a character to allow the character to appear on the CRT 16A. Specifically, even when only a "command name" is uttered from a television program (or the user), the control section 11 fails to instruct the components of the receiver body to perform their respective operations for executing the command according to the control code associated with the command. Therefore, even if only the voice "Channel Eight" is uttered from a television program, the current channel is not changed to channel 8. For the user to be allowed to change channels, the user 2 simply has to speak "Mr. Television, Channel 8" to the television receiver.

If it is determined in step s1 that the code outputted from the recognized voice processing section 33 is a call-up control code, the control section 11 retrieves an agent program associated with this call-up control code from the table stored in the storage section 21 (see FIG. 4) and then executes the agent program thus retrieved (step s2). If the code outputted from the recognized voice processing section 33 is the call-up control code "0000000011" for example, the control section 11 executes agent program A. The character defined in agent program A is Mr. Television.

When the agent program starts up, the control section 11 instructs the OSD processing section 14 to display the character image defined in the agent program and a message of the character responding to the user in an OSD manner.

According to this instruction, the OSD processing section 14 superimposes the character image stored in the OSD image memory 22 and the response message of the character on video signals. Then, the CRT 16A displays, for example, the image of character 3 and the response message of the character 3 as shown in FIG. 1.

Subsequently, the control section 11 determines whether or not a command to power ON/OFF, change channels or adjust the sound volume or a like command has been inputted (step s3). This determination is based on whether or not a control code has been inputted to the control section 11 from the recognized voice processing section 33.

If it is determined that the control code has been inputted, the control section 11 instructs the components of the receiver body to perform their respective operations for executing the command (step s6). If the code outputted from the recognized voice processing section 33 is the control code "1100000111" for example, the control section 11 notifies the tuner 12 that the channel to be selected is channel 1.

On the other hand, if it is determined in step s3 that any command has not been inputted, the control section 11 determines whether or not a time period not shorter than a fixed time period has elapsed from the latest input of a control code or call-up control code read out by the recognized voice processing section 33 (step s4). If it is determined that the time period not shorter than the fixed time period has not elapsed yet, the process returns to step s3 to continue the process.

The fixed time period is a preset time period, for example, 10, seconds. If the fixed time period is too short, the user must utter the name of the character every time the user gives a command. If the fixed time period is too long, a malfunction due to a voice generated from a television program is likely. The reason for the likelihood of such a malfunction is that if, for example, only the voice "Channel Eight" is generated from some television program during displaying of a character image on the CRT-16A, the current channel is changed to channel 8, undesirably.

Alternatively, if it is determined in step s4 that the recognized voice processing section 33 has not read out any control code for a time period not shorter than the fixed time period, stated otherwise, any control code has not been inputted for a time period not shorter than the fixed time period, the control section 11 terminates the agent program (step s5) to abort the process.

The control section 11 instructs the OSD processing section 14 to cause the character image defined in the agent program and the response message of the character to disappear from the screen according to an agent program terminating process.

According to this instruction, the OSD processing section 14 stops superimposing the character image stored in the OSD image memory 22 and the response message of the character on video signals. Then, the image of the character 3 and the response message of the character 3 as shown in FIG. 1 for example disappear from the CRT 16A.

The process described above does not need any manual operation by the user and makes it possible to lower the possibility of malfunctions caused by voices generated from television programs.

Further, the user 2 is allowed to utter a command interactively with a character displayed.

Description will be made of a television receiver according to the second embodiment of the present invention.

Figure 6:
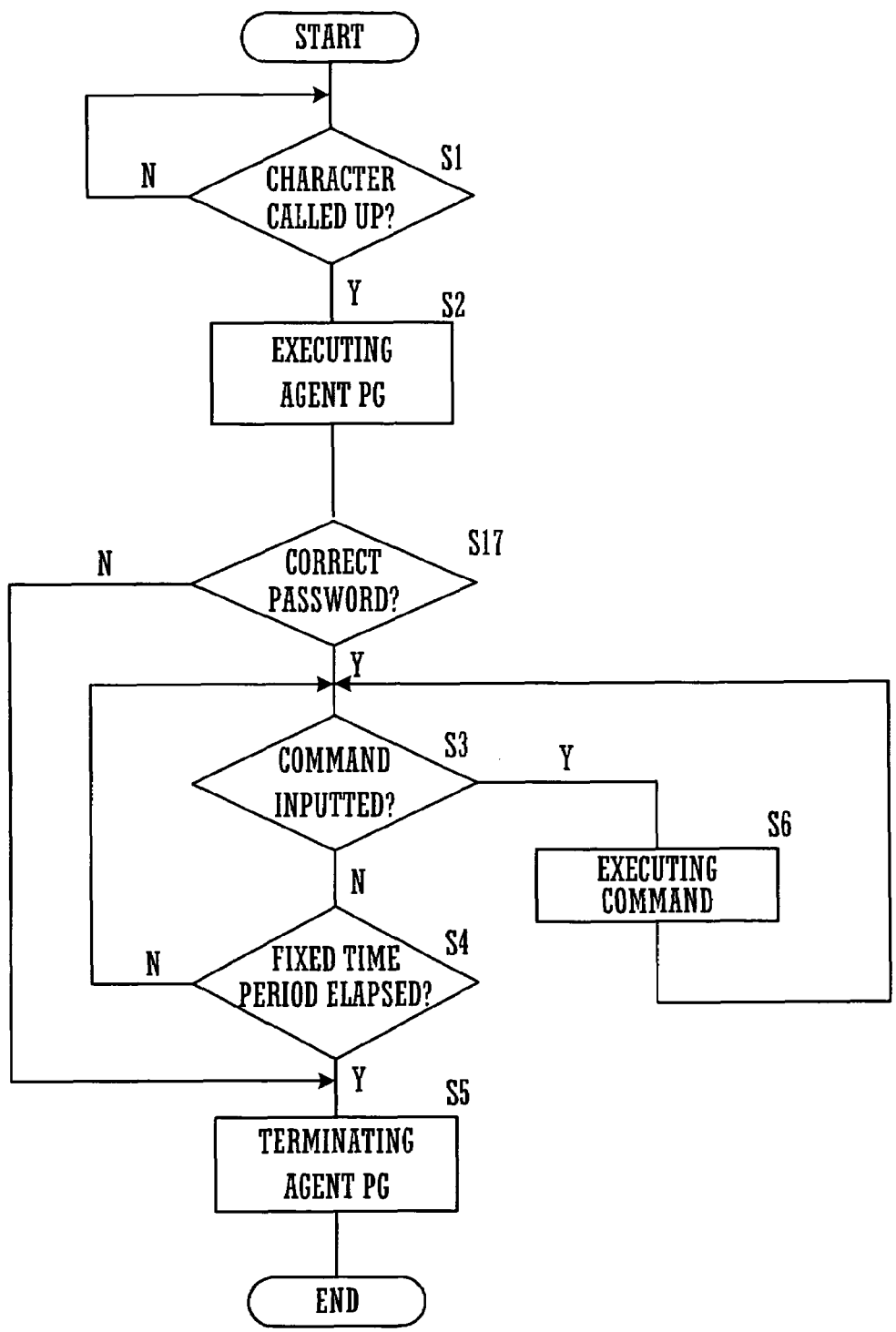
FIG. 6 is a flowchart of process steps of an operation performed by a control section of a television receiver according to a second embodiment of the present invention.

FIG. 6 is a flowchart of process steps of an operation performed by a control section of the television receiver according to the second embodiment of the present invention. The operation of the control section includes an additional step s17 of determination between the step s2 of execution and the step s3 of determination in FIG. 5.

The operation shown in FIG. 6 is performed on the assumption that restrictions are imposed on watching. For example, an agent program A is written so as to enable the user to watch every television program, while an agent program B written so as not to enable the user to watch deleterious television programs such as programs for adults.

When the agent program A, which enables the user to watch every television program, is executed (step s2), the control section 11 performs password authentification by following the procedure described below. The agent program A, as used here, is previously written so as to cause the image of character 3 ("Mr. Television") to be displayed on the CRT 16A and then request the password of the user when the agent program A itself is started up.

When the agent program A is started up, the control section 11 first instructs the OSD processing section 14 to display the image of the character 3 ("Mr. Television") defined in the agent program A on the CRT 16A according to the agent program A.

Immediately thereafter, the control section 11 instructs the OSD processing section 14 to display the password input prompting screen on the CRT 16A in the OSD manner according to the agent program A. By so doing, the control section 11 prompts the user 2 to input (utter) the password. Therefore, the user 2 has to utter "character's name", "password" and "command name" sequentially.

The password input prompting screen is previously stored in the OSD image memory 22 for the OSD processing section 14 to superimpose the password input prompting screen on video signals. Preferably, the password input prompting screen is displayed near the character 3 in the OSD manner.

Subsequently, the control section 11 determines whether or not the password inputted is correct (step s17).

If it is determined that the password is correct, the control section 11 advances the process to step s3 to continue the process.

On the other hand, if it is determined that the password is not correct, the control section 11 terminates the agent program A (step s5) to abort the process. The control section 11 instructs the OSD processing section 14 to cause the image of the character 3 defined in the agent program A to disappear from the screen according to an agent program A terminating process.

While this embodiment is configured to impose restrictions on watching by terminating the agent program A if it is determined in step 5 that the password is incorrect, the control section 11 may be configured to disregard any command to change the current channel to a channel providing a deleterious television program for imposing restrictions on watching.

In this way, restrictions can be imposed on television programs that may be watched by children.

A television receiver according to the third embodiment of the present invention will be described below.

Figure 7:
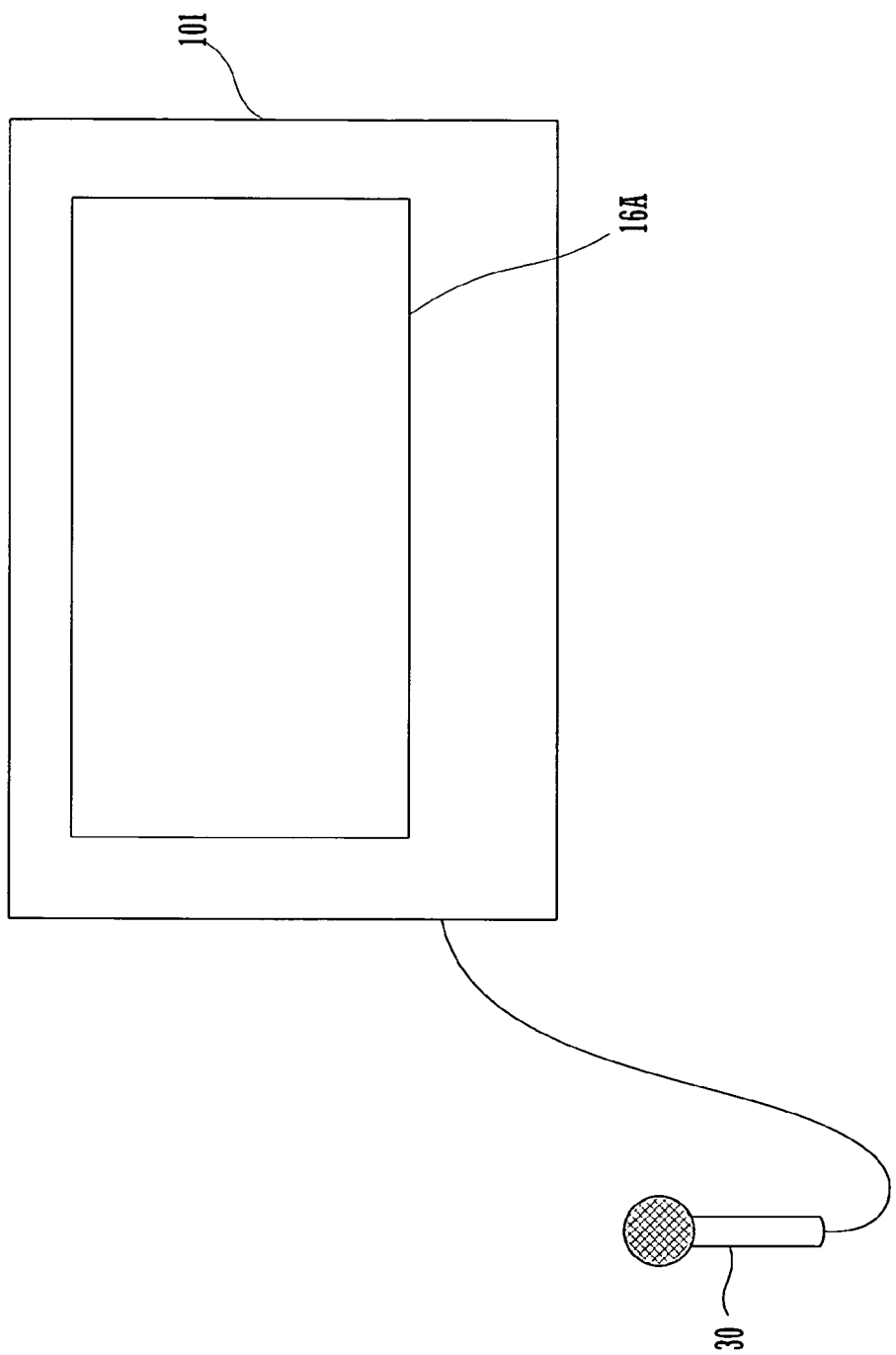
FIG. 7 is a view showing the outward appearance of a television receiver according to a third embodiment of the present invention.
Figure 8:
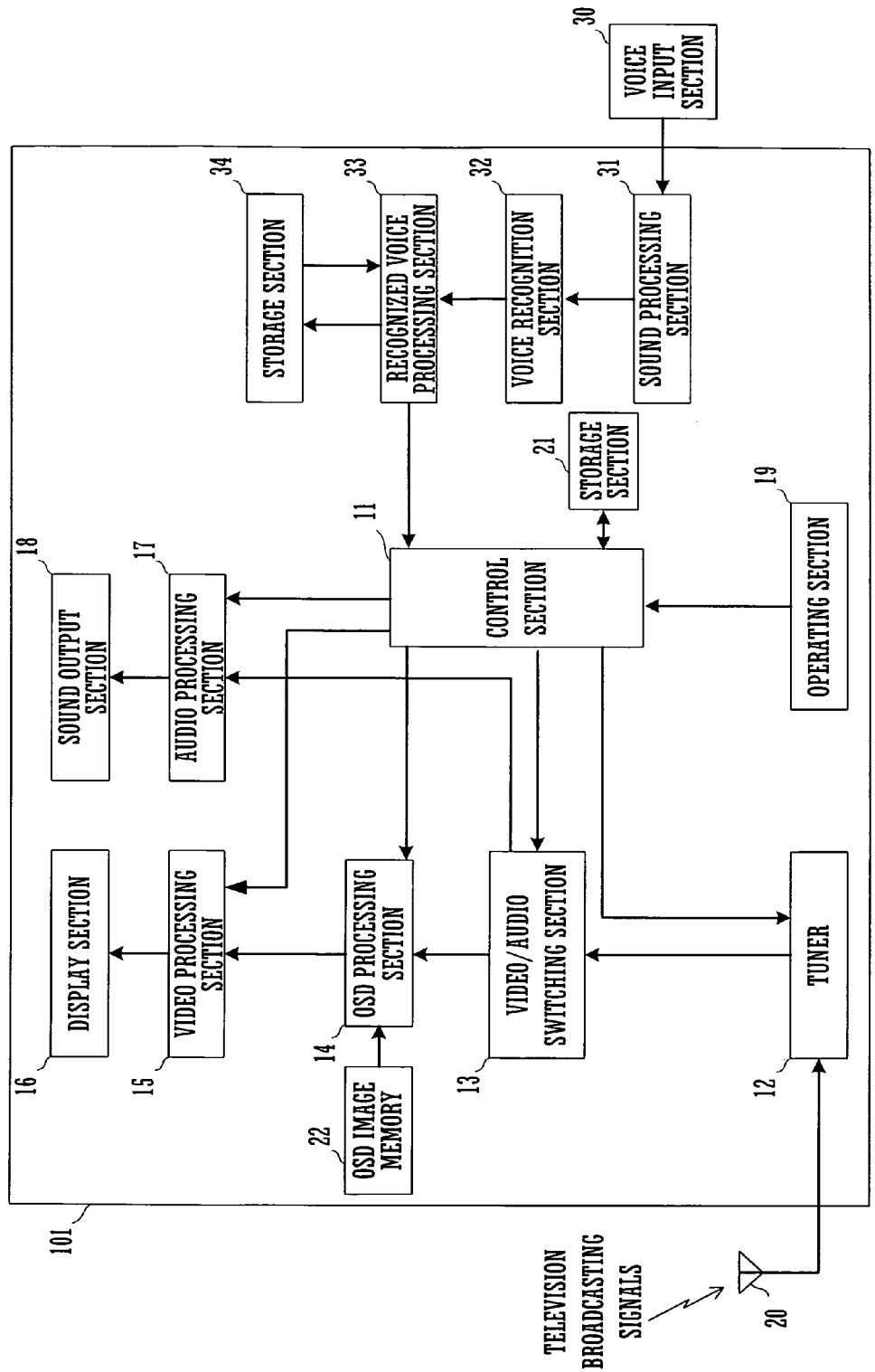
FIG. 8 is a block diagram showing a basic configuration of the television receiver according to the third embodiment of the present invention.

FIG. 7 is a view showing the outward appearance of a television receiver according to the third embodiment of the present invention. FIG. 8 is a block diagram showing a basic configuration of the television receiver according to the third embodiment of the present invention.

The TV receiver 101 shown in FIGS. 7 and 8 is different from the TV receiver 1 shown in FIG. 2 in that the voice input section 30 is located exteriorly of the cabinet of the TV receiver.

The operation of the TV receiver 101 shown in FIGS. 7 and 8 is the same as that of the TV receiver 1 shown in FIG. 2 (see FIG. 5).

A television receiver according to the fourth embodiment of the present invention will be described below.

Figure 9:
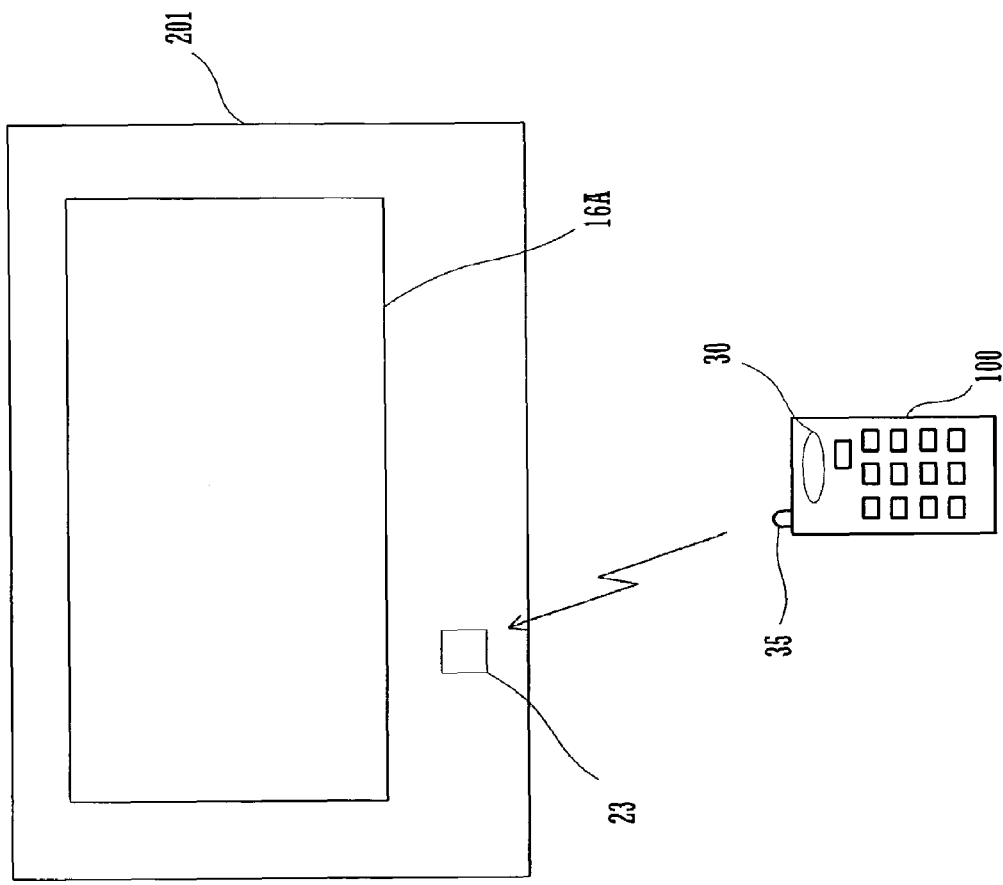
FIG. 9 is a view showing the outward appearance of a television receiver according to a fourth embodiment of the present invention.
Figure 10:
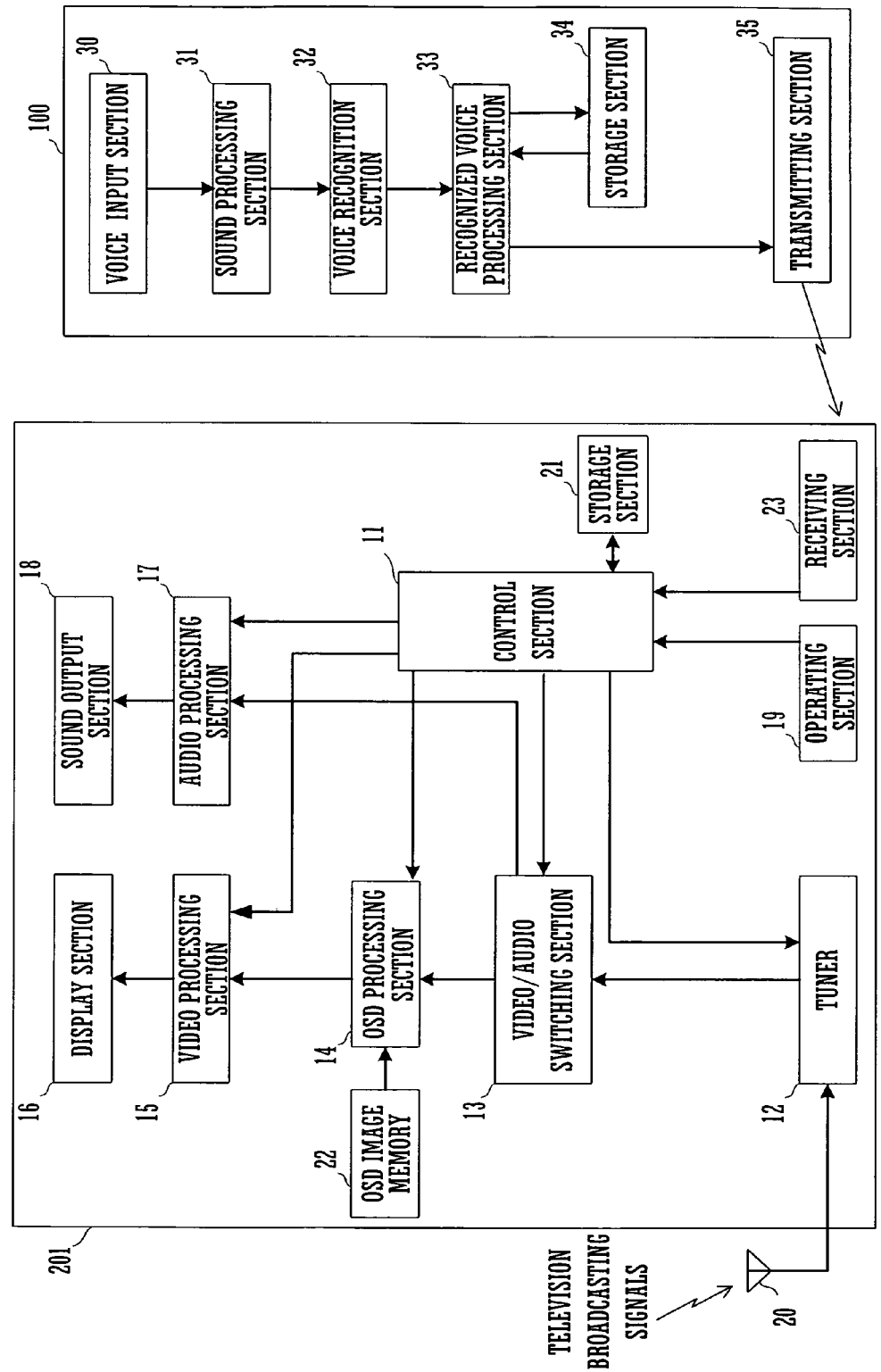
FIG. 10 is a block diagram showing a basic configuration of the television receiver according to the fourth embodiment of the present invention.

FIG. 9 is a view showing the outward appearance of a television receiver according to the fourth embodiment of the present invention. FIG. 10 is a block diagram showing a basic configuration of the television receiver according to the fourth embodiment of the present invention.

The TV receiver 201 shown in FIGS. 9 and 10 is different from the TV receiver 1 shown in FIG. 2 in that the TV receiver 201 is provided with a remote controller 100 for remote control of the TV receiver 201 and a receiving section 23 for receiving control codes or call-up control codes transmitted from the remote controller 100 (transmitting section 35).

The remote controller 100 includes a voice input section 30, sound processing section 31, voice recognition section 32, recognized voice processing section 33, storage section 34, and transmitting section 35 configured to transmit a control code or call-up control code read out by the recognized voice processing section 33.

With this embodiment, the user 2 utters voices against the voice input section 30 of the remote controller 100.

In this embodiment, the TV receiver 201 and the remote controller 100, as a whole, are equivalent to the television receiver defined by the present invention.

The operation of the TV receiver 201 shown in FIGS. 9 and 10 is the same as that of the TV receiver 1 shown in FIG. 2 (see FIG. 5).

While only certain presently preferred embodiments of the present invention have been described in detail, as will be apparent for those skilled in the art, certain changes and modifications may be made in embodiments without departing from the spirit and scope of the present invention as defined by the following claims.

What is claimed is:

1. A television receiver comprising:
    an OSD display section configured to display a desired OSD;
    a voice input section to which voices are inputted;

a voice recognition section configured to recognize the voices inputted from the voice input section;

a first storage section configured to store an agent program for assisting a user in inputting a command;

a second storage section having prestored therein a control code associated with a voice representing a command to power ON/OFF, change channels or adjust a sound volume or an analogous command, and a call-up control code associated with a call-up voice for causing the OSD display section to display a character image in an OSD manner, the character image being defined in the agent program;

a recognized voice processing section configured to read the control code or the call-up control code associated with the voice recognized by the voice recognition section out of the second storage section; and a control section configured to execute, out of the first storage section, the agent program to cause the OSD display section to display the character image when the recognized voice processing section has read the call-up control code associated with the call-up voice recognized by the voice recognition section out of the second storage section, wherein the control section instructs components of a receiver body to perform respective operations for executing the command according to the control code read out by the recognized voice processing section only during a time period during which the OSD display section displays the character image.

2. The television receiver according to claim 1, wherein:

the first storage section stores a plurality of agent programs;

each of the plurality of agent programs defines each of a plurality of different character images;

the second storage section has prestored therein a plurality of call-up control codes each associated with a respective one of a plurality of call up voices for causing the OSD display section to display each of the plurality of character images in the OSD manner; and when the recognized voice processing section has read the call-up control code associated with the call-up voice recognized by the voice recognition section out of the second storage section, the control section executes, out of the first storage section, the agent program associated with the call-up control code to cause the OSD display section to display the character image defined in the agent program.

3. The television receiver according to claim 1, wherein the control section terminates the agent program to cause the character image defined in the agent program to disappear from the OSD display section when the recognized voice processing section has not read the control code for a time period not shorter than a fixed time period.

4. The television receiver according to clam, 1, further comprising a remote controller, the remote controller having the voice input section, the voice recognition section, the storage section, the recognized voice processing section, and a transmitting section configured to transmit the control code or the call-up control code read out by the recognized voice processing section.

5. The television receiver according to claim 2, wherein:

restrictions are imposed on watching at least one of the plurality of agent programs; and the control section:

causes the OSD display section to display a password input prompting screen in the OSD manner when executing, out of the first storage section, the agent program associated with the call-up control code, and if restrictions are not imposed on watching the executed agent program; and terminates the agent program if an inputted password is not correct.

* * * * *